(12) United States Patent
Millard

(10) Patent No.: US 10,581,965 B2
(45) Date of Patent: Mar. 3, 2020

(54) MIRRORING FLOW CONFIGURATIONS FOR INTERNET PROTOCOL RECEIVERS

(71) Applicant: Tektronix, Inc., Beaverton, OR (US)

(72) Inventor: Duncan G. Millard, Portland, OR (US)

(73) Assignee: PROJECT GIANTS, LLC, Beaverton, OR (US)

(*) Notice: Subject to any disclaimer, the term of this patent is extended or adjusted under 35 U.S.C. 154(b) by 169 days.

(21) Appl. No.: 15/859,329

(22) Filed: Dec. 30, 2017

(65) Prior Publication Data

US 2019/0104176 A1 Apr. 4, 2019

Related U.S. Application Data

(60) Provisional application No. 62/565,891, filed on Sep. 29, 2017.

(51) Int. Cl.
*H04L 29/08* (2006.01)
*H04L 12/26* (2006.01)
*G06F 3/14* (2006.01)
*H04L 29/06* (2006.01)

(52) U.S. Cl.
CPC ........ *H04L 67/1095* (2013.01); *G06F 3/1454* (2013.01); *H04L 43/10* (2013.01); *H04L 65/4076* (2013.01); *H04L 67/38* (2013.01); *G09G 2370/02* (2013.01); *G09G 2370/042* (2013.01); *G09G 2370/10* (2013.01)

(58) Field of Classification Search
CPC . H04L 67/1095; H04L 43/10; H04L 65/4076; H04L 67/38; G09G 2370/042; G09G 2370/10; G09G 2370/02
See application file for complete search history.

(56) References Cited

U.S. PATENT DOCUMENTS

| 9,906,594 | B2* | 2/2018 | Cuzzort | ................... H04N 7/14 |
| 2015/0207878 | A1* | 7/2015 | Cuzzort | ................... H04N 7/14 |
| | | | | 345/2.2 |

FOREIGN PATENT DOCUMENTS

EP 3076647 10/2016

OTHER PUBLICATIONS

European Patent Office, Extended European Search Report and Written Opinion for European Application 18197739.8, dated Feb. 26, 2019, 10 pages, Munich, Germany.

* cited by examiner

*Primary Examiner* — Arvin Eskandarnia
(74) *Attorney, Agent, or Firm* — Miller Nash Graham & Dunn LLP

(57) ABSTRACT

Disclosed is a mechanism of operating a Networked Media Open Specifications (NMOS) Application Programming Interface (API) at a node controlling a local device including a local receiver. A flow message is received via the NMOS API. The flow message contains a flow state of a target receiver at a remote node. A local receiver at the local device is configured to mirror the flow state of the target receiver at the remote node. The NMOS API then notifies a registry with an updated flow state of the local receiver at the local device.

16 Claims, 6 Drawing Sheets

MIRRORING FLOW CONFIGURATIONS FOR INTERNET PROTOCOL RECEIVERS

CROSS-REFERENCES TO RELATED APPLICATIONS

The present application claims benefit from U.S. Provisional Patent Application Ser. No. 62/565,891, filed Sep. 29, 2017, and entitled "Mirroring Flow Configurations For Internet Protocol Receivers," which is incorporated herein by reference as if reproduced in its entirety.

FIELD OF THE DISCLOSURE

This disclosure is directed to systems and methods associated with aspects of a test and measurement system in a media production environment, and, more particularly, to systems and methods for allowing a receiver node to mirror another receiver node in a media production environment operating according to Networked Media Open Specifications (NMOS).

BACKGROUND

Media production environments employ a broad range of physical infrastructure, such as video recording equipment, video processing equipment, data storage equipment, data communication equipment, audio recording equipment, audio processing equipment, etc. Efforts are being made to standardize application level communications between this diverse array of equipment. Such standardization allows such equipment to easily interact. This in turn allows for equipment to be upgraded on a per components basis while mitigating interactivity issues with existing equipment. Such standardization also supports maintenance, testing, and automation in the video production environment. Such standardization may even support the addition of additional functionality due to the automated interactivity between the components provided by the standardized communication protocols.

Examples in the disclosure address these and other issues.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

NMOS is an example standardized mechanism to control a media production environment. NMOS employs various Application Programming Interfaces (APIs), which allow network based application level communication with video production infrastructure. For example, NMOS allows communication between video cameras, audio recorders, post production equipment, monitors, etc. NMOS APIs employ internet protocol (IP) based communication, which allow various components to communicate packet based messages. In a particular example, a production monitor may switch between video streams, known as flows, generated and communicated by a plurality of video cameras. For testing purposes, a user may wish to employ a secondary monitor to mirror the content shown on the production monitor.

Disclosed herein are example mechanisms to allow a node, such as a monitor, to mirror another node. For example, nodes may include devices, which in turn include senders, receivers, or both. Nodes register with a registry. A connection manager node then controls connections between nodes. A mirror node may mirror a receiver node by employing polling. In the polling example, a mirror node is set up to be aware of a mirror relationship with the receiver node. The mirror node periodically polls the receiver node or the registry. In response, the mirror node receives the current flow state of the receiver node. When the receiver node swaps to a new sender node, the mirror node receives the updated flow state indicating the new sender after the next poll message is sent. The mirror node is then reconfigured to match the flow state of the receiver node, and hence obtains the flow received by the receiver node. In a connection manager controlled example, the connection manager maintains awareness of the mirror relationship between the mirror node and the receiver node. The connection manager also controls the flow state of the receiver node. Accordingly, when the connection manager configures the receiver node to swap to a new sender, the connection node also configures to mirror node to swap to the same sender as the receiver node.

Figure 1A:
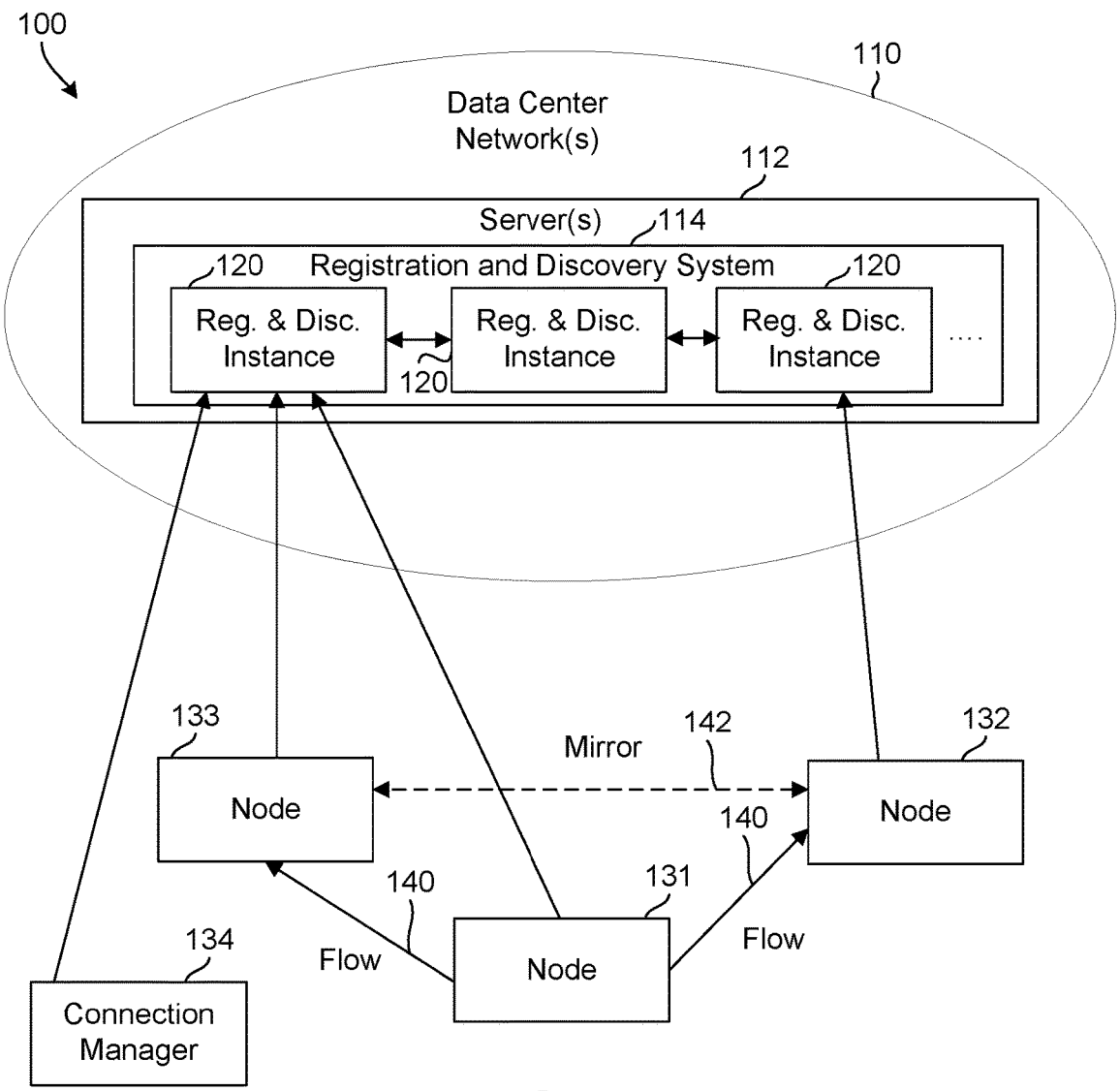
FIGS. 1A-1C are schematic diagrams of an example media production system configured to interact according to Networked Media Open Specifications (NMOS) based communication protocols.
Figure 1B:
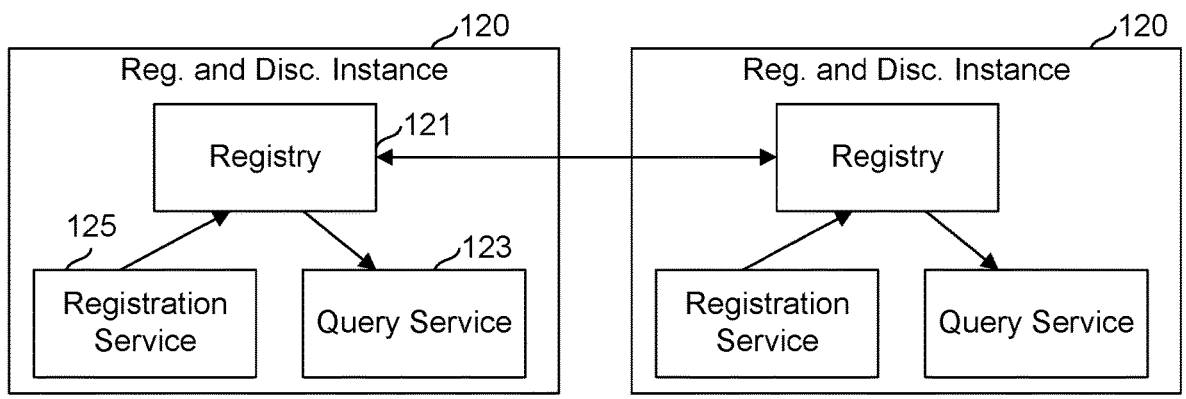
Figure 1C:
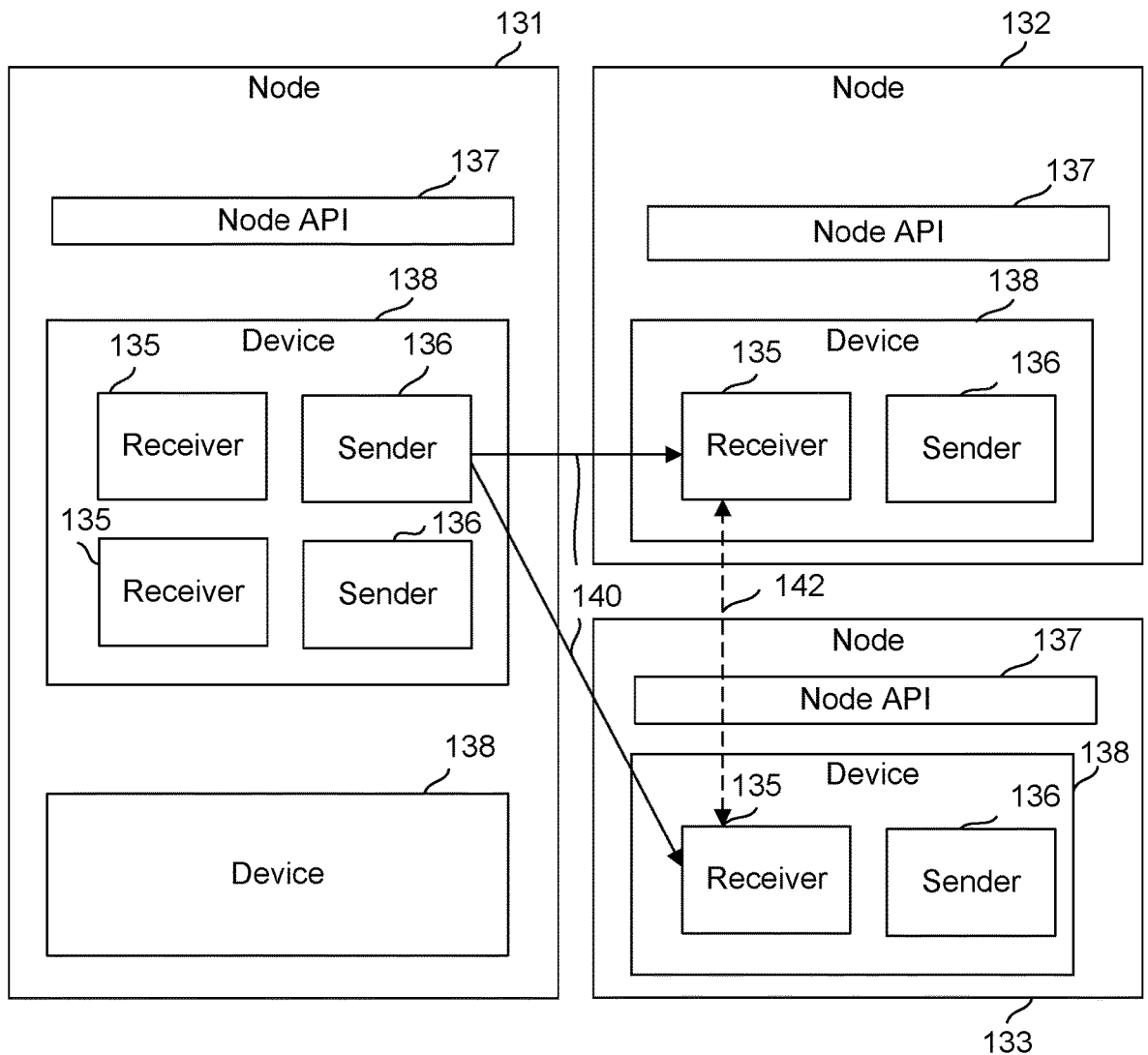

FIGS. 1A-1C are schematic diagrams of an example media production system 100 configured to interact according to NMOS based communication protocols. Referring first to FIG. 1A, the system 100 includes a registration and discovery system 114 operating on servers 112 in one or more data center networks 110. The system 100 also includes nodes 131, 132, and 133 configured to register with the registration and discovery system 114. The system 100 also includes a connection manager 134 capable of managing connections between the nodes 131-133.

A data center network 110 is any pool of computational resources interconnected via a communication network. The data center network 110 may be contained within a single building or may contain multiple geographically diverse networks capable of connecting over a core network of electrical and/or optical cables. As an example, a data center network 110 may contain a plurality of servers 112. The servers 112 may be interconnected in racks and rows via electrical and/or optical cables. The data center network 110 may also include gateways to maintain network security and cross-domain addressing. The servers 112 may be any computational device capable of providing computational resources. For example, the servers 112 may contain processors, memory, and/or networking resources. The servers 112 may each be dedicated to a particular data center tenant or may be configured in a cloud model by employing elastic resource provisioning. The servers 112 may communicate via media access (MAC) layer broadcast protocols (e.g. broadcast), internet protocol (IP) layer protocols (e.g. unicast), or combinations thereof.

The registration and discovery system 114 operates by employing server 112 hardware. For example, instructions to operate the registration and discovery system 114 are stored in memory, such as cache, random access memory (RAM), read only memory (ROM), etc. on the servers 112. The instructions are then executed by processors on the servers 112. The network resources of the servers 112 are employed to allow the nodes 131-133 and the connection manager 134 to communicate with the registration and discovery system 114. As the data center network 110 may contain geographically diverse servers 112 operating as a cloud network, the registration and discovery system 114 may also be distributed to simultaneously operate over a large physical area on multiple machines. The registration and discovery system 114 is configured to allow nodes from multiple local networks to register capabilities and current states. Such nodes can then query the registration and discovery system 114 to determine the capabilities and states of other nodes.

The registration and discovery system 114 is configured to operate as a plurality of registration and discovery instances 120. Referring to FIG. 1B, the registration and discovery instances 120 contain a registry 121, a registration service 125, and a query service 123. The registry 121 may be implemented as a database. For example, the registry 121 may be any memory structure capable of storing, updating, and retrieving node capabilities and current node states. The registration service 125 is any process capable of communicating with a node, for example via an API, for the purpose of receiving a node capability or node state. The registration service 125 then communicates such node capabilities and/or states to the registry 121 for storage. The query service 123 is any process capable of communicating with a node, for example via an API, for the purpose receiving queries regarding node capabilities/states and providing responses to such queries. For example, the query service 123 may receive a query from a node, obtain data from the registry 121 in response to the query, and provide a response containing the requested data. The registration service 125 and/or query service 123 may communicate with nodes via IP based protocols, such as Representational state transfer (RESTful) Hypertext transfer protocol (HTTP) and/or JavaScript object notation (JSON). As a particular example, the registration service 125 and/or query service 123 may communicate with nodes via HTTP GET and/or POST commands over an IP network (e.g. the Internet) between the nodes and the relevant registration and discovery instance 120. The registration and discovery instances 120 may be separated to support different media production environments, and may employ different network addresses for communication purposes. Accordingly the registration and discovery instances 120 may be considered as a distributed group of processes. However, the registries 121 may be configured to communicate registry entries in order to allow registry entry replication. As such, a registry 121 may be configured to contain a complete and/or partial list of nodes, node capabilities, and nodes states spanning the registration and discovery system 114.

Referring back to FIG. 1A, a plurality of nodes may interact with the registration and discovery instances 120. While only four nodes are depicted to promote simplicity/clarity, it should be noted that an arbitrarily large number of nodes may interact with the registration and discovery instances 120. In an NMOS based media production system 100, a node is a host for one or more devices that provide a related block of functionality. Such devices may include devices that generate data, such as video recorders, audio recorders, etc. and devices that receive the data, such as monitors, speakers, video/audio processing equipment, etc. For purposes of convenience, a node that generates data is referred to herein as a sender node and a node that receives such data is referred to as a receiver node. As depicted, node 131 acts as a sender node that generates data (e.g. a video and/or audio stream) and communicates such data as a flow 140. A flow 140 is any related stream of data. Nodes 132 and 133 are receiver nodes (e.g. monitors) because nodes 132 and 133 receive the flow 140 transmitted by the sender node 131. Node 132 and 133 have a mirror relationship 142. A mirror relationship 142 indicates that a mirror receiver node takes steps to maintain a common flow state with another receiver node. As used herein, a flow state indicates flows sent or received by a corresponding node at a specified time. For purposes of clarity, node 132 is referred to herein as a receiver node and node 133 is referred to as a mirror node that mirrors the flow state of node 132. In other words, whenever receiver node 132 begins receiving a new flow 140 from a new sender, mirror node 133 updates a local flow state to copy the flow state of the receiver node 132, and hence receive a common flow from a common sender node 131. Nodes 131-133 are capable of communicating with registration service(s) 125 and/or query service(s) 123 for the registration and discovery instance(s) 120 to register corresponding devices, device capabilities, and/or current states, such as flow states.

The connection manger 134 is operates as a control node and is configured to manages connections (e.g. flows/flow states) for a set of nodes, such as nodes 131-133. For example, the connection manager 134 contains a display and user inputs. The connection manager 134 is further configured to contact the query service 123 to determine registered information related to nodes 131-133. The connection manager 134 may also change flow states by contacting the registration service 125 and/or by contacting the nodes 131-133 directly. Such changes are displayed to a user via a user display and may be made based on user input (e.g. from a keyboard, mouse, trackball, touchscreen, etc.).

Referring now to FIG. 1C, the nodes 131-133 include a node API 137 and one or more devices 138 that in turn include receivers 135 and/or senders 136. The connection manger 134, while not depicted in greater detail, is substantially similar to nodes 131-133. A device 138 is any related block of functionality as provided by one or more hardware components. Accordingly, a device 138 may include one or more video recorders, audio recorder, monitors, speakers, audio/video processing systems, etc. The node 131-133 hosts, and hence manages, communications for the corresponding devices 138. The devices 138 communicate via receivers 135 and/or senders 136. A device 138 may have any number of senders 136 and receivers 135 as desired for a particular implementation. A sender 136 is a set of resources employed for sending data flow(s). For example, a sender 136 may include a network card, network port(s), wireless network adaptors, network address(es), etc. A receiver 135 is a set of resources employed for receiving data flow(s). For example, a receiver 136 may include a network card, network port(s), wireless network adaptors, network address(es), etc. A node API 137 is a programming interface that converts commands from a remote node into a form that can be interpreted and executed by a corresponding device 138, receiver 135, and/or sender 136. Accordingly, a connection manager 134 may communicate commands to a node 131-133 via the node API 137 and vice versa. Further, a node 131-133 may communicate with a registration service 125 and/or a query service 123 via a node API 137 and vice versa. Such communications via the node API 137 allow a flow 140 to be sent by a sender 136 and received by a receiver 135, for example via broadcast over a local area network (LAN), virtual local area network (VLAN), virtual extensible local area network (VXLAN), etc. Such communications via the node API 137 also allow a mirror node 133 to maintain a mirror relationship 142 with a receiver node 132 by receiving a common flow 140 from a common sender 136 at a corresponding receiver 135.

Figure 2:
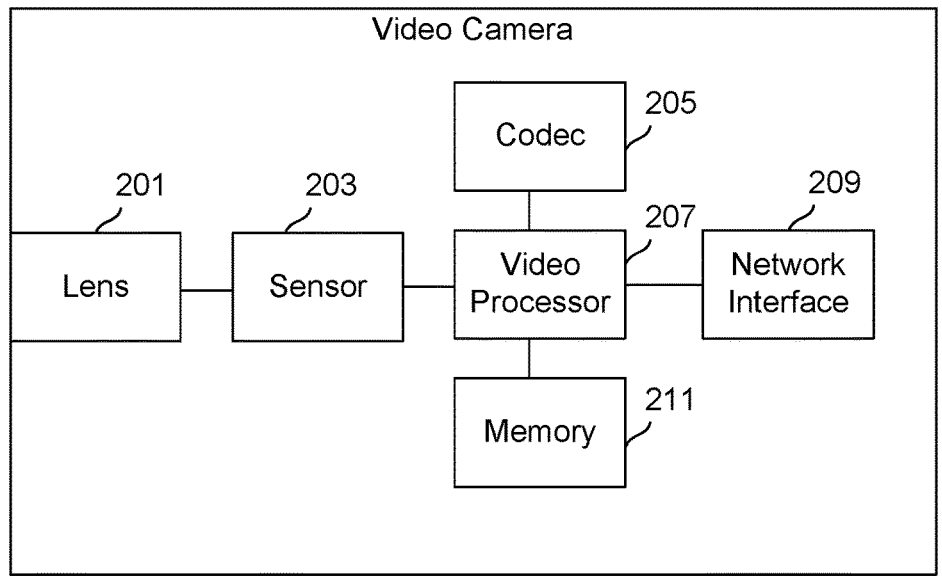
FIG. 2 is a schematic diagram of an example sender node.

FIG. 2 is a schematic diagram of an example sender node 200, which may implement a sender node 131 in system 100. Specifically, the sender node 200 operates a video camera as a device. The sender node 200 device includes a lens 201. The lens 201 is a transmissive optical device capable of focusing a light beam by employing refraction. Light refracted by the lens 201 is captured by a sensor 203, such as an image sensor. The sensor 203 is a circuit capable of converting/capturing variable attenuation of light waves, as received from the lens 201, into electrical signals conveying data representing images. The electrical signals are forwarded to a video processor 207. A video processor 207 is a processing circuit capable of applying various filters to the captured data representing the images. The filters may remove visual artifacts, provide color correction, and/or perform other video pre-processing techniques. For example, the video processor 207 may employ a coder-decoder (codec) 205 to encode the image data into a compressed standardized form. The compression allows the image data to occupy less storage space for ease of storage and transmission. The codec 205 encodes the image data in a standardized manner so that a receiver node can decompress the image data to obtain the images as originally captured by the sensor 203/video processor 207. The video processor 207 may also operate node 200 by executing instructions stored in memory. The image data may be stored in a memory 211, which can be any form a memory component capable of storing image data and/or executable instructions to operate the video processor 207 (e.g. cache, RAM, ROM, etc.). The sender node 200 video camera device also include a network interface 206 that acts as one or more device senders and/or receivers. The network interface 209 may be a wired or a wireless interface containing corresponding transceivers and network communications equipment. When acting as a sender, such as sender 136, the network interface 209 may convert compressed image data into a flow of packets for unicast, broadcast, and/or multicast transmission over a network. When acting as a receiver, such as receiver 135, the network interface 209 may receive commands to operate the sender node 200 as well as receive any other relevant data. The sender node 200 may also include components to record, encode, and/or transmit sound over the network via the network interface 209 as desired. It should be noted that sender node 200 is included as a non-limiting example for clarity of discussion. Many different sender node 200 types can be employed for particular purposes in a media production environment, and a full discussion of such variety is beyond the scope of the present disclosure.

Figure 3:
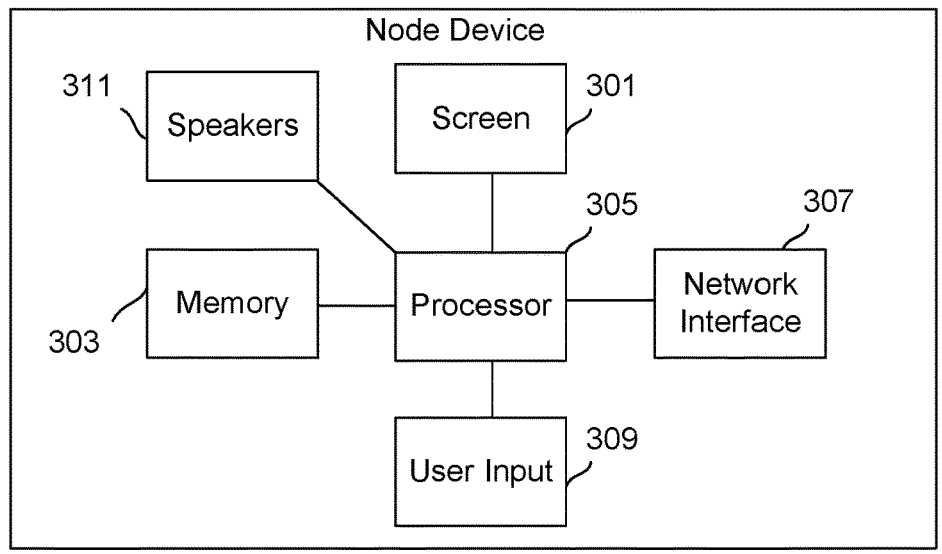
FIG. 3 is a schematic diagram of an example receiver node.

FIG. 3 is a schematic diagram of an example receiver node 300, which may be employed to implement a receiver node 132 and/or a mirror node 133 in system 100. Depending on the example, node 300 may also be employed to implement a connection manager 134 and/or a server 114. Node 300 may employ a network interface 307, which may be substantially similar to the network interface 209 of sender node 200. For example, when acting as a receiver node 300, the network interface 307 may act as a receiver 135, and hence may receive flow(s) from a sender node. In some examples, the network interface 307 may also act as a sender 136, for example to support communication with other nodes, data forwarding, etc. Data from the network interface 307 is processed by a processor 305. Depending on the example, the processor 305 may include any processing circuitry, such as an application specific integrated circuit (ASIC), a digital signal processor (DSP), a field programmable gate array (FPGA), etc. The processor 305 may employ a codec to decode image data for display on a screen 301. The processor 305 may also alter image data, for example by employing video editing processes. The processor 305 may operate based on user inputs 309, which may include any device to support user control of data management, such as a mouse, keyboard, touch screen, etc. The processor 305 may also operate node 300 by executing instructions stored in a memory 303. The user input 309 may be coupled directly to the node 300 or may communicate with the node 300 via the network interface 307. The screen 301 may be any device capable of displaying image data. The screen 301 may be coupled directly to the node 300 or may communicate with the node 300 via the network interface 307. The screen 301 provides user feedback to commands and may also act as a user input 309 in the case of a touchscreen. The node 300 also include memory 303, which may be similar to memory 211 of sender node 200. Hence, the memory 303 may be configured to store media for further processing, long term storage, and/or temporarily during display by the screen 301. The receiver node 300 may also include speakers 311, which may be any transducer capable of reproducing sound, for example as captured by a sender nod and received via the network interface 307. It should be noted that not all of the components disclosed may be employed in some examples and that additional components may be employed in other examples. Receiver node 300 is depicted to disclose various general components that may be employed on a receiver node, mirror node, connection manager, and/or server to support clarity of discussion. Hence, the components of node 300 should be considered as exemplary and non-limiting.

Figure 4:
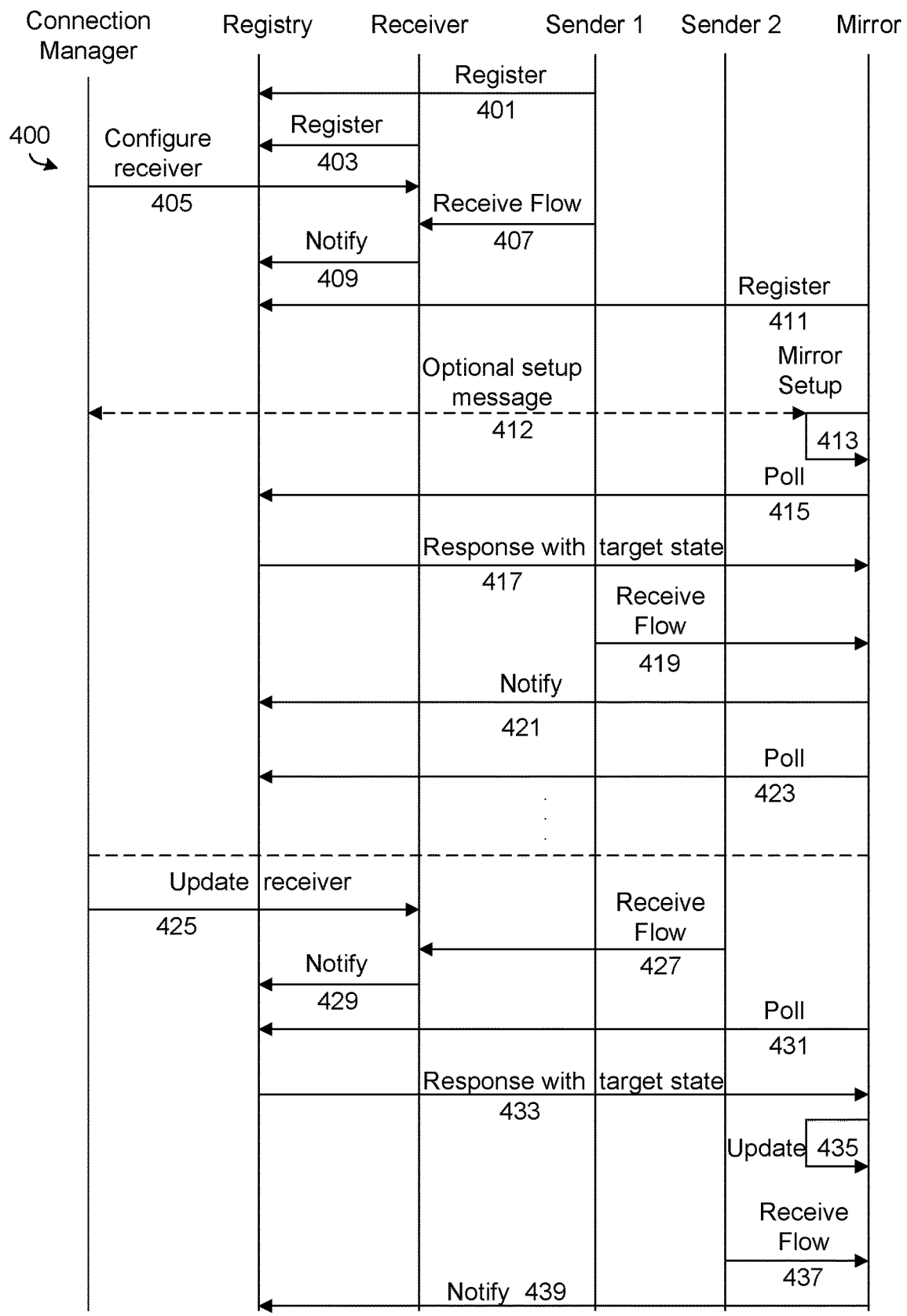
FIG. 4 is a protocol diagram of an example mechanism to mirror a receiver node via polling.

FIG. 4 is a protocol diagram of an example mechanism 400 to mirror a receiver node via polling, for example by employing a node 200 and/or 300 to implement a system 100. The mechanism 400 may be implemented by processors that execute instructions stored in memory at the corresponding nodes. Mechanism 400 may also serve as a method of operating the corresponding node(s). It should be noted that mechanism 400 employs a connection manager, a registry (e.g. registry 121, registration service 125, and/or query service 123), a receiver node, a first sender node (sender 1), a second sender node (sender 2), and a mirror node for purposes of clarity of discussion. However, additional nodes may be employed as desired for particular examples/use cases.

Mechanism 400 may begin when sender 1 transmits a register message 401 toward a registry. The register message 401 may be sent on startup, and indicates sender 1's capabilities, addresses, available flows, etc. Sender 1 may then begin operating. For example, when sender 1 is a video camera, sender 1 may then begin capturing video and transmitting the flow over a network. A receiver node may also forward a register message 403 to the registry, for example on startup. The register message 403 contains the receiver node's capabilities, network addresses, current flow state, etc.

A connection manager may then configure the receiver 405 to begin employing the flow from sender 1. For example, the connection manager may populate a screen with data indicating available sender nodes and receiver nodes in the network based on information queried from the registry. A user may indicate which receiver nodes should receive flows from corresponding sender nodes. The connection manager may then configure the receiver 405 based on the user input. After configuration, the receiver begins receiving the flow 407 from sender 1. Receiving the flow 407 changes the flow state at the receiver. Accordingly, the receiver transmits a notify message 409 to the registry indicating the new flow state (e.g. receiving a flow from sender 1).

Sometime later, a mirror node may be initiated to mirror the receiver node. For example, a receiver node may include a monitor that displays a flow from one or more cameras, with a view that shifts over time based on user input. The mirror node may be employed for testing purposes, for example to show what is actually displayed on the receiver node. The mirror node may also be employed to mirror the receiver in order to allow multiple users to track a live stream. For example, the receiver may be a primary monitor displaying and/or forwarding a production video feed being broadcast to viewers based on multiple cameras, and the mirror node may be employed to display the content being broadcast to the viewers. In any case, upon startup, the mirror node may transmit a register message 411 to the registry. The register message 411 may contain the mirror node's capabilities, network addresses, current flow state, etc. The mirror node may be configured locally and/or remotely to mirror the receiver node. For example, if the mirror node is configured remotely (e.g. at the configuration manager), then the configuration manager transmits an optional setup message 412 to the mirror node indicating the mirror node should mirror the receiver. However, in some cases, a user may physically interact with the mirror node and configure the mirror node to mirror the receiver. In yet other cases, the mirror node may transmit the setup message 412 to the connection manager based on local user input. In any of the above cases, the mirror node is configured 413 to mirror the receiver and hence receive whatever flow the receiver is receiving. Such configuration may be performed via a NMOS API operating at the mirror node.

In mechanism 400, the mirror node is responsible for maintaining the mirror relationship with the receiver node. Accordingly, the mirror node transmits a poll message 415 to the registry. The poll message 415 requests that the registry indicate the current flow state of the receiver node. In other words, from the perspective of the mirror node the poll message 415 requests the flow state of a target receiver at a remote receiver node. The registry then transmits a response message 417 with the target state. The mirror node then receives the response message 417 as a flow message via the NMOS API. In mechanism 400, the flow message is received from the registry. The flow message indicates to the mirror node the flow state of the target receiver at the remote receiver node. The mirror node then configures a local receiver at a local device hosted by the mirror node to mirror the flow state of the target receiver at the remote node. Stated more simply, the mirror node copies the flow state of the receiver node. The mirror node may then receive the flow 419. In other words, by mirroring the flow state of the target receiver at the remote receiver node, the mirror obtains, at the local receiver, a shared flow received by the target receiver. The shared flow is received from a shared sender node, in this case sender 1. The mirror node then transmits a notify message 421 to the registry, for example via the NMOS API. The notify message 421 indicates the updated flow state of the local receiver at the local device hosted by the mirror node. The mirror node then begins to periodically transmit poll messages 423 to the registry to determine when the receiver changes a flow state. Hence, the poll messages request the flow state of the target receiver at the remote receiver node.

Sometime later, as indicated by the dashed line, the connection manager transmits an update receiver 425 message to the receiver. The update receiver message 425 directs the receiver to change flow state, in this case to begin receiving a flow from sender 2 instead of sender 1. The receiver node is reconfigured and then begins receiving a flow 427 from sender 2. The receiver node transmits a notify message 429 to the registry to indicate that the receiver node's flow state has changed.

Meanwhile, the mirror node continues to transmit periodic poll messages. After the next poll message 431 to the registry, the registry transmits a response 433 with an updated target flow state at the receiver. The mirror node then updates 435 a local flow state to match the updated flow state at the receiver node. The mirror node is then configured to receive the flow 437 from sender 2 instead of sender 1. Accordingly the mirror node is capable of automatically following changes to the receiver by employing periodic poll messages. Once the update 435 is complete, the mirror node transmits a notify message 439 to the registry indicating a change in flow state. The mirror node may then return to polling the registry until the receiver changes to another sender, at which point messages 431-439 are repeated.

Figure 5:
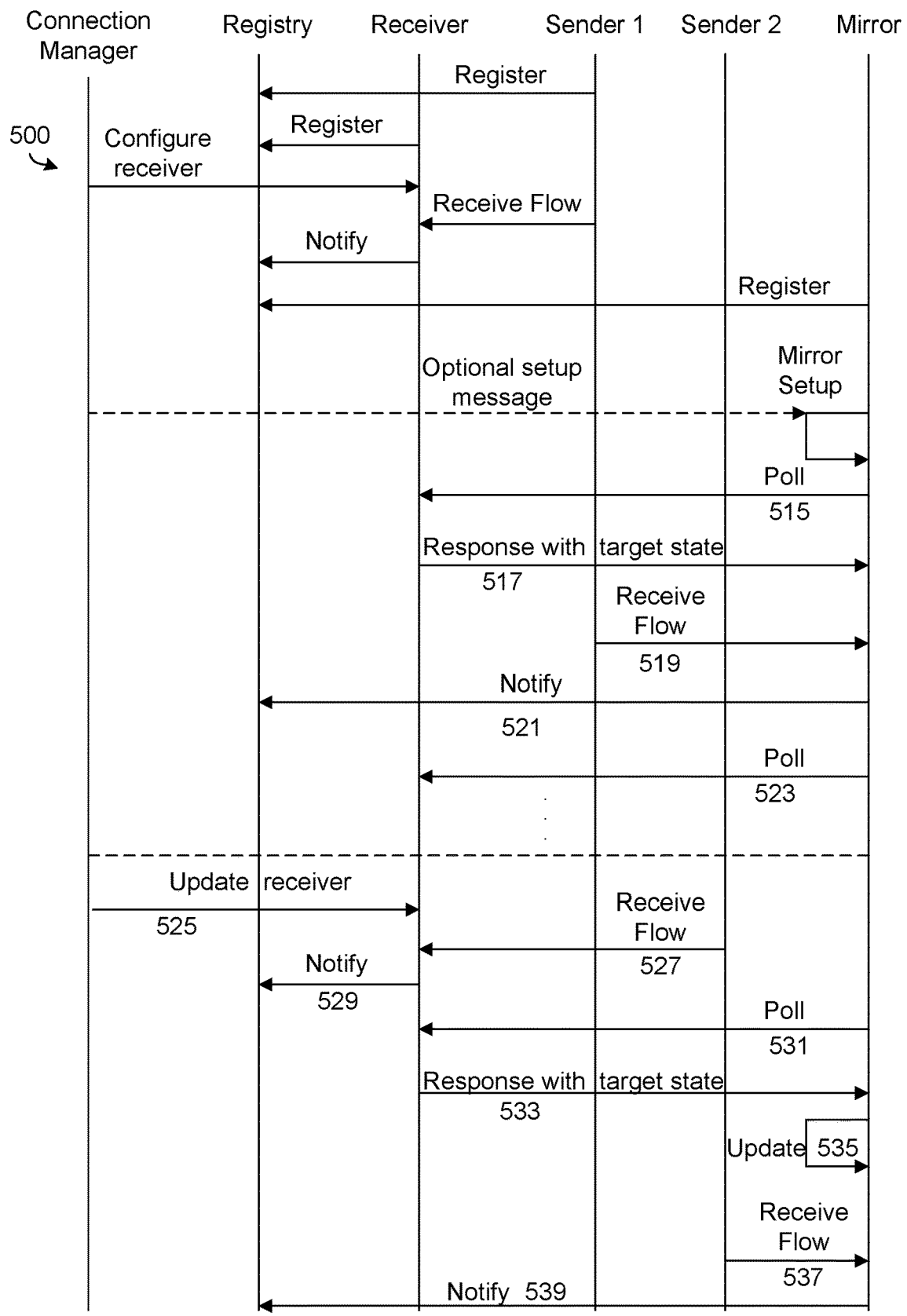
FIG. 5 is a protocol diagram of another example mechanism to mirror a receiver node via polling.

FIG. 5 is a protocol diagram of another example mechanism 500 to mirror a receiver node via polling. Mechanism 500 is substantially similar to mechanism 400, except the mirror node polls the receiver node directly instead of polling the registry. For purposes of brevity, repeat message/steps from mechanism 400 are not numbered/discussed in detail. After mirror relationship setup, mirror node transmits a poll message 515. The poll message 515 is similar to poll message 415, but is transmitted directly to the receiver node to request a current polls state. The receiver node then sends a response message 517 containing the flow state of the target receiver hosted by the receiver node. The mirror node then copies the flow state, receives the flow 519 and sends a notify message 521 to the registry in a manner similar to flow 419 and notify message 421, respectively. The mirror node then begins to periodically transmit poll messages 523 to the remote receiver node in a manner similar to poll messages 423, except the poll message 523 are transmitted to the receiver node and not the registry. The poll messages continue to request the flow state of the target receiver at the remote receiver node.

Sometime later, the receiver is updated 525 to a new sender 2, in a manner similar to update message 425. The receiver receives the flow 527 and sends a notify message 529 to the registry in a manner similar to the received flow 427 and the notify message 429, respectively. The mirror node then sends a poll message 531 to the receiver after the update in flow state. The receiver then transmits a response message with the updated flow state from the target receiver in the remote receiver node. Hence, in mechanism 500, the flow message containing the flow state is received at the mirror node from the remote receiver node. The mirror node may then update the local flow state 535, receive the flow 537 from the updated sender 2, and notify the registry in a manner similar to update 435, receive flow 437, and notify message 439, respectively.

Figure 6:
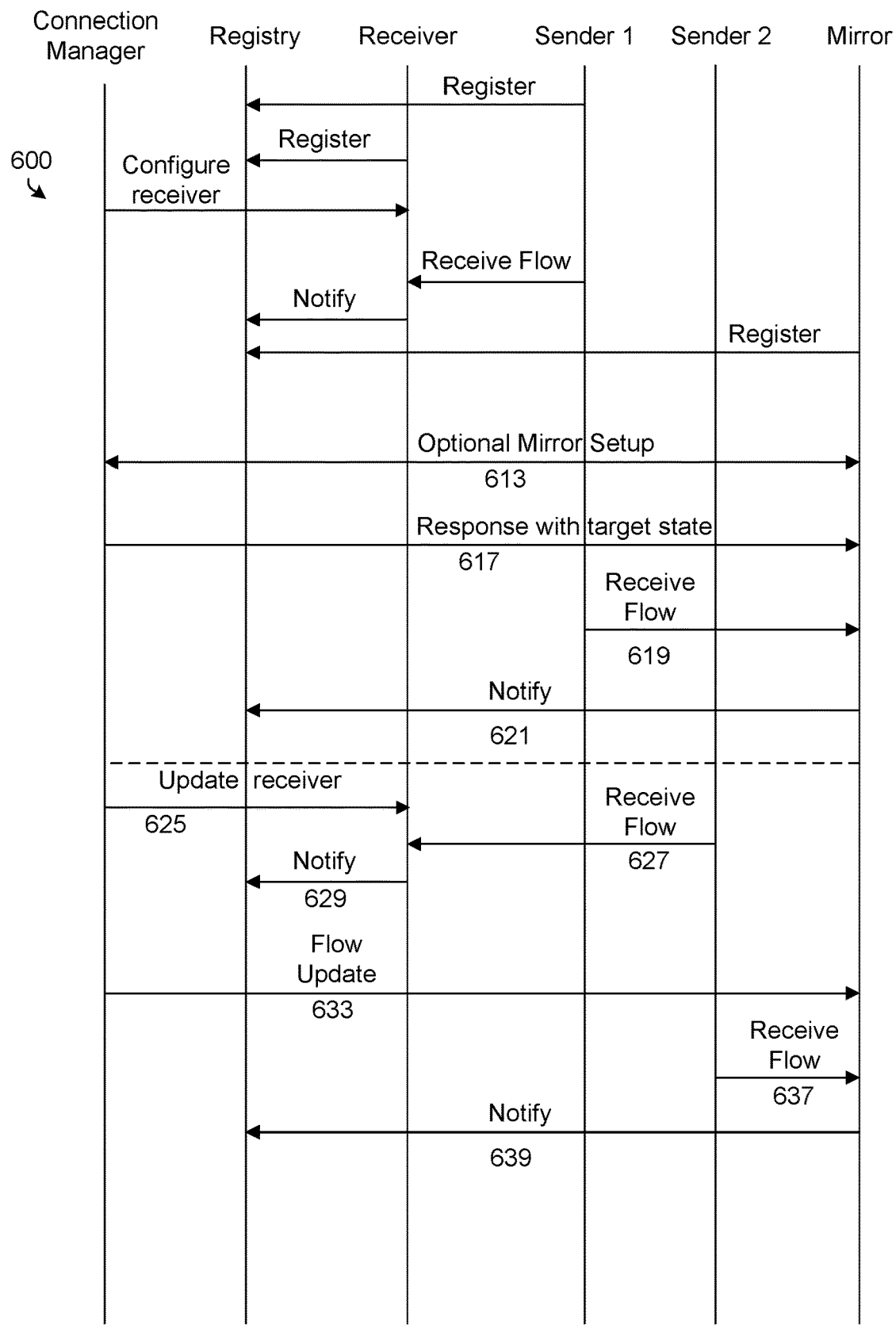
FIG. 6 is a protocol diagram of an example mechanism to mirror a receiver node by employing a connection manager.

FIG. 6 is a protocol diagram of an example mechanism 600 to mirror a receiver node by employing a connection manager. As with mechanism 400 and 500, mechanism 600 may be implemented by employing a node 200 and/or 300 to in a system 100. Unlike mechanisms 400-500, mechanism 600 does not employ polling. Instead, in mechanism 600, the connection manager maintains awareness of the mirror relationship. As such, the connection manager transmits a flow state to the mirror node whenever an update is transmitted to the mirrored receiver node. For purposes of brevity, repeat message/steps from mechanisms 400-500 are not numbered/discussed in detail. After the mirror node starts up and registers with the registry, the mirror node is configured with the mirror node relationship. In the event the mirror node is setup locally (e.g. not by the connection manager), the mirror node may transmit an optional mirror setup message 613 to the connection manager indicating the mirror relationship with the receiver. This message informs the connection manager of the mirror flow relationship between the mirror node and the receiver in the event that the connection manager has not been configured with such relationship information. Hence, the mirror node setup message 613 is received at the connection manager and indicates a mirror flow relationship between the receiver node and the mirror node. As noted above, data indicating a mirror flow relationship may also be received as user input at the connection manager. In some cases, the connection manager may transmit the optional mirror setup message 613 to the mirror node in response to receiving data indicating the mirror flow relationship.

The connection manager then transmits a response message 617 to the mirror node containing the target receiver node's flow state. The connection manager may query the registry to determine this information. Hence, flow messages may be received at the mirror node from the connection manager. The mirror node updates a local configuration to copy the receiver node's flow state. Upon updating the flow state, mirror node transmits a notify message 621 to the registry to indicate the change in flow state.

Sometime later, the connection manager determines to change the flow state at the receiver, for example to receive a flow from sender 2 instead of sender 1 after receiving user input. The connection manager transmits an update receiver message 625, which acts as a flow change message. The update receiver message 625 is transmitted to an NMOS API at the receiver node to direct the target receiver at the receiver node to change a flow state. The receiver node then receives the flow 627 from sender 2 and transmits a notify message 629 to the registry as in mechanisms 400 and 500. Further, in response to transmitting the update receiver message 625, the connection manager also transmits a flow update message 633 to the mirror node. The flow update message 633 contains the flow state of the target receiver at the receiver node. The mirror node then receives the updated flow 637 from the updated sender and transmits a notify message 639 to the registry with updated flow information. It should be noted that any time the receiver swaps to a new flow, the connection manager also updates the mirror node to maintain the flow relationship. It should also be noted that the mirror node need not be aware of the mirror relationship, for example when the mirror relationship is setup at the connection manager. In such a case, the mirror node only knows that a new flow state is occasionally sent from the connection manager.

Examples of the disclosure may operate on a particularly created hardware, on firmware, digital signal processors, or on a specially programmed computer including a processor operating according to programmed instructions. The terms "controller" or "processor" as used herein are intended to include microprocessors, microcomputers, ASICs, and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Examples

Illustrative examples of the technologies disclosed herein are provided below. An embodiment of the technologies may include any one or more, and any combination of, the examples described below.

Example 1 includes a computer readable storage medium having instructions stored thereon that, when executed by a processor of a node, cause the node to: operate a Networked Media Open Specifications (NMOS) Application Programming Interface (API); receive a flow message via the NMOS API, the flow message containing a flow state of a target receiver at a remote node; configure a local receiver at a local device to mirror the flow state of the target receiver at the remote node; and notify, via the NMOS API, a registry with an updated flow state of the local receiver at the local device.

Example 2 includes the computer readable storage medium of Example 1, wherein mirroring the flow state of the target receiver at the remote node includes obtaining, at the local receiver, a shared flow received by the target receiver, the shared flow received from a shared sender node.

Example 3 includes the computer readable storage medium of any of Examples 1-2, wherein the processor further causes the node to periodically transmit poll messages to a registry, the poll messages requesting the flow state of the target receiver at the remote node.

Example 4 includes the computer readable storage medium of any of Examples 1-3, wherein the flow message is received from the registry.

Example 5 includes the computer readable storage medium of any of Examples 1-2, wherein the processor further causes the node to periodically transmit poll messages to the remote node, the poll messages requesting the flow state of the target receiver at the remote node.

Example 6 includes the computer readable storage medium of any of Examples 1-2 and 5, wherein the flow message is received from the remote node.

Example 7 includes the computer readable storage medium of any of Examples 1-6, wherein the processor further causes the node to transmit a mirror setup message to a connection manager.

Example 8 includes the computer readable storage medium of any of Examples 1-7, wherein the flow message is received from a connection manager.

Example 9 includes a method comprising: operating a Networked Media Open Specifications (NMOS) Application Programming Interface (API) at a node controlling a local device including a local receiver; receiving a flow message via the NMOS API, the flow message containing a flow state of a target receiver at a remote node; configuring the local receiver at the local device to mirror the flow state of the target receiver at the remote node; and notifying, via the NMOS API, a registry with an updated flow state of the local receiver at the local device.

Example 10 includes the method of Example 9, wherein mirroring the flow state of the target receiver at the remote node includes obtaining, at the local receiver, a shared flow received by the target receiver, the shared flow received from a shared sender node.

Example 11 includes the method of any of Examples 9-10, further comprising periodically transmitting poll messages to a registry, the poll messages requesting the flow state of the target receiver at the remote node.

Example 12 includes the method of any of Examples 9-11, wherein the flow message is received from the registry.

Example 13 includes the method of any of Examples 9-10 further comprising periodically transmitting poll messages to the remote node, the poll messages requesting the flow state of the target receiver at the remote node.

Example 14 includes the method of any of Examples 9-10 and 13, wherein the flow message is received from the remote node.

Example 15 includes the method of any of Examples 9-14, further comprising transmitting a mirror setup message to a connection manager.

Example 16 includes the method of any of Examples 9-15, wherein the flow message is received from a connection manager.

Example 17 includes a computer readable storage medium having instructions stored thereon that, when executed by a processor of a connection manager, cause the connection manager to: receive data indicating a mirror flow relationship between a receiver node and a mirror node; transmit a flow change message to a Networked Media Open Specifications (NMOS) Application Programming Interface (API) at a receiver node, the flow change message directing target receiver at the receiver node to change a flow state; and in response to transmitting the flow update message, transmit a flow update message to a NMOS API at the mirror node, the flow update message containing the flow state of the target receiver at the receiver node.

Example 18 includes the computer readable storage medium of Example 17, wherein the processor further causes the connection manager to transmit a mirror setup message to the mirror node in response to receiving the data indicating the mirror flow relationship.

Example 19 includes the computer readable storage medium of any of Examples 17-18, wherein the processor further causes the connection manager to receive the data indicating the mirror flow relationship from the mirror node as part of a mirror setup message.

Example 20 includes the computer readable storage medium of any of Examples 17-19, wherein the processor further causes the connection manager to receive the data indicating the mirror flow relationship as user input.

The previously described examples of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

I claim:

1. A computer readable storage medium having instructions stored thereon that, when executed by a processor of a node, cause the node to:
   operate a Networked Media Open Specifications (NMOS) Application Programming Interface (API);
   receive a flow message via the NMOS API, the flow message containing a flow state of a target receiver at a remote node;
   configure a local receiver at a local device to mirror the flow state of the target receiver at the remote node; and
   notify, via the NMOS API, a registry with an updated flow state of the local receiver at the local device.

2. The computer readable storage medium of claim 1, wherein mirroring the flow state of the target receiver at the remote node includes obtaining, at the local receiver, a shared flow received by the target receiver, the shared flow received from a shared sender node.

3. The computer readable storage medium of claim 1, wherein the processor further causes the node to periodically transmit poll messages to a registry, the poll messages requesting the flow state of the target receiver at the remote node.

4. The computer readable storage medium of claim 3, wherein the flow message is received from the registry.

5. The computer readable storage medium of claim 1, wherein the processor further causes the node to periodically transmit poll messages to the remote node, the poll messages requesting the flow state of the target receiver at the remote node.

6. The computer readable storage medium of claim 5, wherein the flow message is received from the remote node.

7. The computer readable storage medium of claim 1, wherein the processor further causes the node to transmit a mirror setup message to a connection manager.

8. The computer readable storage medium of claim 1, wherein the flow message is received from a connection manager.

9. A method comprising:
   operating a Networked Media Open Specifications (NMOS) Application Programming Interface (API) at a node controlling a local device including a local receiver;
   receiving a flow message via the NMOS API, the flow message containing a flow state of a target receiver at a remote node;
   configuring the local receiver at the local device to mirror the flow state of the target receiver at the remote node; and
   notifying, via the NMOS API, a registry with an updated flow state of the local receiver at the local device.

10. The method of claim 9, wherein mirroring the flow state of the target receiver at the remote node includes obtaining, at the local receiver, a shared flow received by the target receiver, the shared flow received from a shared sender node.

11. The method of claim 9, further comprising periodically transmitting poll messages to a registry, the poll messages requesting the flow state of the target receiver at the remote node.

12. The method of claim 11, wherein the flow message is received from the registry.

13. The method of claim 9, further comprising periodically transmitting poll messages to the remote node, the poll messages requesting the flow state of the target receiver at the remote node.

14. The method of claim 13, wherein the flow message is received from the remote node.

15. The method of claim 9, further comprising transmitting a mirror setup message to a connection manager.

16. The method of claim 9, wherein the flow message is received from a connection manager.

* * * * *